United States Patent [19]

Santilli et al.

[11] Patent Number: 5,651,813
[45] Date of Patent: Jul. 29, 1997

[54] PREPARATION OF INK JET INKS WITH SODIUM N-METHYL-N-OLEOYL TAURATE

[75] Inventors: Domenic Santilli, Webster; Douglas Eugene Bugner, Rochester, both of N.Y.

[73] Assignee: Eastman Kodak Company, Rochester, N.Y.

[21] Appl. No.: 565,263

[22] Filed: Nov. 30, 1995

[51] Int. Cl.$^6$ ..................................... C09D 11/02
[52] U.S. Cl. ..................... 106/31.67; 106/31.78; 106/31.86
[58] Field of Search ................. 106/20 R, 20 D, 106/23 H, 503

[56] References Cited

U.S. PATENT DOCUMENTS

| | | | |
|---|---|---|---|
| 4,156,616 | 5/1979 | Dietz et al. | 106/499 |
| 4,968,352 | 11/1990 | Keys et al. | 106/496 |
| 5,151,129 | 9/1992 | Morrison et al. | 106/496 |
| 5,279,654 | 1/1994 | Kiers et al. | 106/20 R |
| 5,393,461 | 2/1995 | Fillipova | 106/23 C |
| 5,478,705 | 12/1995 | Czekai | 430/449 |

*Primary Examiner*—Helene Klemanski
*Attorney, Agent, or Firm*—John R. Everett

[57] ABSTRACT

A process for making ink jet inks, comprising the steps of:

(A) providing a dispersion containing a pigment, a carrier for the pigment and as a dispersant sodium N-methyl-N-oleoyl taurate;

(B) mixing the pigment dispersion with rigid milling media;

(C) introducing the mixture of step (B) into mill;

(D) milling the mixture from step (C) until the pigment particle size less than 1.5 μm;

(E) separating the milling media from the mixture milled in step (D); and (F) diluting the mixture from step (E) to obtain an ink jet ink having a pigment concentration suitable for ink jet printers.

5 Claims, No Drawings

PREPARATION OF INK JET INKS WITH SODIUM N-METHYL-N-OLEOYL TAURATE

CROSS REFERENCE TO RELATED APPLICATIONS

This application is cross-referenced to U.S. Ser. No. 08/565,363 entitled "INK JET INKS CONTAINING NANOPARTICLES OF ORGANIC PIGMENTS" by J. Bishop and D. Czekai, filed on even date herewith.

FIELD OF THE INVENTION

This invention relates to the field of ink jet printing.

BACKGROUND OF THE INVENTION

Ink jet printing is a non-impact method for producing images by the deposition of ink droplets on a substrate (paper, transparent film, fabric, etc.) in response to digital signals. Ink jet printers have found broad applications across markets ranging from industrial labeling to short run printing to desktop document and pictorial imaging. The inks used in ink jet printers are generally classified as either dye-based or pigment-based.

In pigment-based inks, the colorant exists as discrete particles. These pigment particles are usually treated with addenda known as dispersants or stabilizers which serve to keep the pigment particles from agglomerating and settling out of the carrier.

The process of preparing inks from pigments commonly involves two steps: (a) a dispersing or milling step to break up the pigment to the primary particle, and (b) a dilution step in which the dispersed pigment concentrate is diluted with a carrier and other addenda to a working strength ink. In the milling step, the pigment is usually suspended in a carrier (typically the same carrier as that in the finished ink) along with rigid, inert milling media. Mechanical energy is supplied to this pigment dispersion, and the collisions between the milling media and the pigment cause the pigment to deaggregate into its primary particles. A dispersant or stabilizer, or both, is commonly added to the pigment dispersion to facilitate the deaggregation of the raw pigment, to maintain colloidal particle stability, and to retard particle reagglomeration and settling.

Although there are known in the prior art a wide variety of dispersing agents for pigmented ink jet inks, they are not without certain problems. For example, many dispersing agents are very selective as far as being able to disperse pigments to sub-micron size. In many instances each class of pigments may require a specific dispersing agent. Another problem encountered with polymeric dispersing agents is that they tend to impart an undesirable high viscosity to the resulting inks. Thus there is a continuing need for improved dispersing agents for pigmented inks.

The ink jet inks are employed in imaging processes which involve the application of liquid ink droplets in a pixel-by-pixel manner to an ink-receiving element. There are numerous schemes which may be utilized to control the deposition of ink droplets on the image-recording element to yield the desired image. In one process, known as continuous ink jet, a continuous stream of droplets is charged and deflected in an imagewise manner onto the surface of the image-recording element, while unimaged droplets are caught and returned to the ink sump. In another process, known as drop-on-demand ink jet, individual ink droplets are projected as needed on to the image-recording element to form the desired image. Common methods of controlling the projection of ink droplets in drop-on-demand printing include piezoelectric transducers and thermal bubble formation.

In any of the known ink jet printing methods, the properties of the inks are critical to the overall performance of the system. One such ink property which has been found to have a profound impact on both the drop ejection process and on the interaction of the ejected ink droplet with the receiving surface and with other inks is surface tension. The control of surface tensions in aqueous inks is most commonly accomplished by additions of small amounts of additives known as surfactants. Sodium N-oleyl-N-methyl tauride is described as an anionic surfactant in pigment dispersions containing phthalocyanine pigments. The dispersion are suggested for use in making, among other things, a nonaqueous printing ink.

SUMMARY OF THE INVENTION

The present invention provides a process for making ink jet inks, comprising the steps of:

(A) providing a dispersion containing a pigment, a carrier for the pigment and as a dispersant; sodium N-methyl-oleoyl taurate (OMT);

(B) mixing the pigment dispersion with rigid milling media;

(C) introducing the mixture of step (B) into a mill;

(D) milling the mixture from step (C) until the pigment particle size is below 1.5 µm;

(E) separating the milling media from the mixture milled in step (D); and (F) diluting the mixture from step (E) to obtain an ink jet ink having a pigment concentration suitable for ink jet printers.

The present invention teaches how to obtain useful ink formulations with OMT as a dispersing agent. OMT is very effective in reducing pigments of various chemical compositions to a size less than 1.5 µm during the milling process. This invention also results in very stable colloidal dispersions free from flocculation and/or sedimentation for long period of time. Finally, it was surprising to find that OMT is useful with a wide variety of pigments, including both organic and inorganic. We have discovered that, contrary to the teaching in the above mentioned prior art, OMT does not perform as a surfactant in the process and ink jet inks provided by this invention. That is, OMT has very little impact on the surface tension of inks. Instead OMT functions primarily as a dispersant or stabilizer for the pigment. In fact, it was also surprising to find that OMT was a very effective dispersant for a wide variety of milling procedures as discussed in more detail below. From 0.05–10.0 weight percent of OMT is effective.

DETAILED DESCRIPTION

There are many different types of materials which may be used as milling media, such as glasses, ceramics, metals, and plastics. In a preferred embodiment, the grinding media can comprise particles, preferably substantially spherical in shape, e.g., beads, consisting essentially of a polymeric resin.

In general, polymeric resins suitable for use herein are chemically and physically inert, substantially free of metals, solvent and monomers, and of sufficient hardness and friability to enable them to avoid being chipped or crushed during milling. Suitable polymeric resins include crosslinked polystyrenes, such as polystyrene crosslinked with divinylbenzene, styrene copolymers, polyacrylates such as poly(methyl methylacrylate), polycarbonates, polyacetals, such as Derlin™, vinyl chloride polymers and copolymers, polyurethanes, polyamides, poly (tetrafluoroethylenes), e.g., Teflon™, and other fluoropolymers, high density polyethylenes, polypropylenes, cellulose ethers and esters such as cellulose acetate, poly(hydroxyethylmethacrylate), poly (hydroxyethyl acrylate), silicone containing polymers such as polysiloxanes and the like. The polymer can be biodegradable. Exemplary biodegradable polymers include poly (lactides), poly(glycolids), copolymers of lactides and glycolide, polyanhydrides, poly(imino carbonates), poly(N-acylhydroxyproline) esters, poly(N-palmitoyl hydroxyprolino) esters, ethylene-vinyl acetate copolymers, poly(orthoesters), poly(caprolactones), and poly (phosphazenes). The polymeric resin can have a density from 0.9 to 3.0 g/cm$^3$. Higher density resins are preferred inasmuch as it is believed that these provide more efficient particle size reduction. Most preferred are crosslinked or uncrosslinked polymeric media based on styrene.

Milling can take place in any suitable grinding mill. Suitable mills include an airjet mill, a roller mill, a ball mill, an attritor mill and a bead mill. A high speed mill is preferred.

By high speed mill we mean milling devices capable of accelerating milling media to velocities greater than about 5 meters per second. The mill can contain a rotating shaft with one or more impellers. In such a mill the velocity imparted to the media is approximately equal to the peripheral velocity of the impeller, which is the product of the impeller revolutions per minute, $\pi$, and the impeller diameter. Sufficient milling media velocity is achieved, for example, in Cowles-type saw tooth impeller having a diameter of 40 mm when operated at 9,000 rpm. The preferred proportions of the milling media, the pigment, the liquid dispersion medium and dispersant can vary within wide limits and depends, for example, upon the particular material selected and the size and density of the milling media etc. The process can be carried out in a continuous or batch mode.

Batch Milling

A slurry of <100 µm milling media, liquid, pigment and dispersant is prepared using simple mixing. This slurry may be milled in conventional high energy batch milling processes such as high speed attritor mills, vibratory mills, ball mills, etc. This slurry is milled for a predetermined length of time to allow comminution of the active material to a minimum particle size. After milling is complete, the dispersion of active material is separated from the grinding media by a simple sieving or filtration.

Continuous Media Recirculation Milling

A slurry of <100 µm milling media, liquid, pigment and dispersant may be continuously recirculated from a holding vessel through a conventional media mill which has a media separator screen adjusted to >100 µm to allow free passage of the media throughout the circuit. After milling is complete, the dispersion of active material is separated from the grinding media by simple sieving or filtration.

In either mode, the preferred amounts and ratios of the ingredients of the mill grind will vary widely depending upon the specific materials and the intended applications. The contents of the milling mixture comprise the mill grind and the milling media. The mill grind comprises pigment, dispersant and a liquid carrier such as water. For aqueous ink jet inks, the pigment is usually present in the mill grind at 1 to 50 weight %, excluding the milling media. The weight ratio of pigment to dispersant may range from 20:1 to 1:2. The high speed mill is a high agitation device, such as those manufactured by Morehouse-Cowles, Hockmeyer et al.

The milling time can vary widely and depends upon the pigment, mechanical means and residence conditions selected, the initial and desired final particle size, etc. For aqueous mill grinds using the preferred pigments, dispersants, and milling media described above, milling times will typically range from 1 to 100 hours. The milled pigment concentrate is preferably separated from the milling media by filtration.

In the present invention, any of the known pigments can be used. Pigments can be selected from those disclosed, for example, in U. S. Pat. Nos. 5,026,427; 5,085,698; 5,141,556; 5,160,370 and 5,169,436. The exact choice of pigment will depend upon the specific color reproduction and image stability requirements of the printer and application. For four-color printers, combinations of cyan, magenta, yellow, and black (CMYK) pigments should be used. An exemplary four color set may be copper phthalocyanine (pigment blue 15), quinacridone magenta (pigment red 122), pigment yellow 139 and carbon black (pigment black 7).

The aqueous carrier medium is water or a mixture of water and at least one water miscible co-solvent. Selection of a suitable mixture depends on requirements of the specific application, such as desired surface tension and viscosity, the selected pigment, drying time of the pigmented ink jet ink, and the type of paper onto which the ink will be printed. Representative examples of water-soluble co-solvents that may be selected include (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) ketones or ketoalcohols such as acetone, methyl ethyl ketone and diacetone alcohol; (3) ethers, such as tetrahydrofuran and dioxane; (4) esters, such as ethyl acetate, ethyl lactate, ethylene carbonate and propylene carbonate; (5) polyhydric alcohols, such as ethylene glycol, diethylene glycol, triethylene glycol, propylene glycol, tetraethylene glycol, polyethylene glycol, glycerol, 2-methyl-2,4-pentanediol 1,2,6-hexanetriol and thiodiglycol; (6) lower alkyl mono- or di-ethers derived from alkylene glycols, such as ethylene glycol mono-methyl (or -ethyl) ether, diethylene glycol mono-methyl (or -ethyl) ether, propylene glycol mono-methyl (or -ethyl) ether, triethylene glycol mono-methyl (or -ethyl) ether and diethylene glycol di-methyl (or -ethyl) ether; (7) nitrogen containing cyclic compounds, such as pyrrolidone, N-methyl-2-pyrrolidone, and 1,3-dimethyl-2-imidazolidinone; and (8) sulfur-containing compounds such as dimethyl sulfoxide and tetramethylene sulfone. Particularly useful solvents are selected from the group consisting of methyl alcohol, ethyl alcohol, n-propyl alcohol, iso-propyl alcohol, n-butyl alcohol, iso-butyl alcohol, sec-butyl alcohol, ethylene glycol, diethylene glycol, propylene gylcol, dipropylene glycol, 1,5-pentanediol, thiodiglycol, 2-ethyl-2-hydroxymethylpropane-1,3-diol, 2-pyrrolidone, N-methyl-2-pyrrolidone and mixtures of two or more of such solvents.

Ink Preparation

In general it is desirable to make the pigmented ink jet ink in the form of a concentrated mill grind, which is subsequently diluted to the appropriate concentration for use in the ink jet printing system. This technique permits preparation of a greater quantity of pigmented ink from the equipment. If the mill grind was made in a solvent, it is diluted with water and optionally other solvents to the appropriate concentration. If it was made in water, it is diluted with either additional water or water miscible solvents to make a mill grind of the desired concentration. By dilution, the ink is adjusted to the desired viscosity, color, hue, saturation density, and print area coverage for the particular application.

In the case of organic pigments, the ink may contain up to approximately 30% pigment by weight, but will generally be in the range of approximately 0.1 to 10%, preferably approximately 0.1 to 5%, by weight of the total ink composition for most thermal ink jet printing applications. If an inorganic pigment is selected, the ink will tend to contain higher weight percentages of pigment than with comparable inks employing organic pigments, and may be as high as approximately 75% in some cases, since inorganic pigments generally have higher specific gravities than organic pigments.

The amount of aqueous carrier medium is in the range of approximately 70 to 99.8 weight %, preferably approximately 90 to 99.8 weight %, based on the total weight of the ink. A mixture of water and a polyhydric alcohol, such as diethylene glycol, is preferred as the aqueous carrier medium. In the case of a mixture of water and diethylene glycol, the aqueous carrier medium usually contains from about 30% water/70% diethylene glycol to about 95% water/5% diethylene glycol. The preferred ratios are approximately 60% water/40% diethylene glycol to about 95% water/5% diethylene glycol. Percentages are based on the total weight of the aqueous carrier medium.

Jet velocity, separation length of the droplets, drop size and stream stability are greatly affected by the surface tension and the viscosity of the ink. Pigmented ink jet inks suitable for use with ink jet printing systems should have a surface tension in the range of about 20 dynes/cm to about 60 dynes/cm and, more preferably, in the range 30 dynes/cm to about 50 dynes/cm. Control of surface tensions in aqueous inks is accomplished by additions of small amounts of surfactants. The level of surfactants to be used can be determined through simple trial and error experiments. Anionic and cationic surfactants may be selected from those disclosed in U. S. Pat. Nos. 5,324,349; 4,156,616 and 5,279,654 as well as many other surfactants known in the ink jet ink art. Commercial surfactants include the Surfynols® from Air Products; the Zonyls® from DuPont and the Fluorads® from 3M.

Acceptable viscosities are no greater than 20 centipoise, and preferably in the range of about 1.0 to about 10.0, preferably 1.0 to 5.0 centipoise at room temperature (25° C.).

Inks according to this invention have a total trace metal contamination concentration of less than 100 parts per million of ink containing 2.5% by weight of pigment.

The ink has physical properties compatible with a wide range of ejecting conditions, i. e., driving voltages and pulse widths for thermal ink jet printing devices, driving frequencies of the piezo element for either a drop-on-demand device or a continuous device, and the shape and size of the nozzle.

Other ingredients are also commonly added to ink jet inks. A humectant, or cosolvent, is commonly added to help prevent the ink from drying out or crusting in the orifices of the printhead. A penetrant may also be optionally added to help the ink penetrate the receiving substrate, especially when the substrate is a highly sized paper. A biocide, such as Proxel® GXL from Zeneca Colours may be added at a concentration of 0.05–0.5 weight percent to prevent unwanted microbial growth which may occur in the ink over time. Additional additives which may optionally be present in ink jet inks include thickeners, conductivity enhancing agents, anti-kogation agents, drying agents, and defoamers.

The ink jet inks provided by this invention are employed in ink jet printing wherein liquid ink drops are applied in a controlled fashion to an ink receptive layer substrate, by ejecting ink droplets from the plurality of nozzles, or orifices, in a print head of ink jet printers. Commercially available ink jet printers use several different schemes to control the deposition of the ink droplets. Such schemes are generally of two types: continuos stream and drop-on-demand.

In drop-on-demand systems, a droplet of ink is ejected from an orifice directly to a position on the ink receptive layer by pressure created by, for example, a piezoelectric device, an acoustic device, or a thermal process controlled in accordance digital data signals. An ink droplet is not generated and ejected through the orifices of the print head unless it is needed. Ink jet printing methods, and related printers, are commercially available and need not be described in detail.

The following examples illustrate the effectiveness of OMT in the preparation of ink jet inks and in maintaining the stability of ink jet inks.

EXAMPLES 1-2

A millgrind was prepared by mixing 10.0 g of pigment Regal 300 from Cabot Chem. Co., 5.0 g of sodium N-methyl-N-oleoyl taurate (OMT) and 60.0 g of de-ionized water. The millgrind was milled on a vibratory mill (model M-5, manufactured by Sweco) for 4 days using 1-mm zirconium oxide beads (obtained from Coming Glass Works). The dispersion was then evaluated visually for particle size using an optical microscope. A dispersant was judged to be useful for forming ink jet inks if the pigment particle size was less than 1.5 µm. The following table summarizes the experiments and the results.

| Examples | Dispersant | Pig./Disp. Ratio | Part. Size (µm) |
| --- | --- | --- | --- |
| 1 | OMT | 1.0/0.5 | <1.0 |
| 2 | OMT | 1.0/0.25 | <1.5 |

EXAMPLES 3-4

OMT was also evaluated as a dispersing agent for organic pigments as shown in the following table:

| Example | Pigment | Dispersant | Pig./Disp. ratio | Particle Size (µm) |
| --- | --- | --- | --- | --- |
| 3 | SFQ[a] | OMT | 1/0.75 | <1 |
| 4 | SFB[b] | OMT | 1/0.75 | <1.5 |

[a]SFQ: Sunfast quinacridone, p.r. 122, from Sun Chem. Co.
[b]SFB: Sunfast blue, p.b. 15:4 from Sun Chemical Co.

EXAMPLES 5-11

OMT was evaluated with carbon black and organic pigments using a media mill instead of a vibratory mill. A description of the media milling process follows: 200 g pigment, 60 g OMT and 1000 g of de-ionized water were introduced into the milling chamber of a horizontal pilot plant Premier/Sussmeryer HML Supermill with a shell capacity of approximately 1.5 liter. The mill was run for 4 hours, and the dispersion was kept at room temperature during the milling process. The milling media was 0.5-mm zirconium silicate. Particle size of the dispersion was measured by the Ultrafine Particle Analyzer (UPA). Results are set forth in the following table.

| Example | Pigment | Dispersant | Part. Size (μm) 10% | 50% | 90% |
| --- | --- | --- | --- | --- | --- |
| 5 | SFQ | OMT | 0.06 | 0.15 | 0.30 |
| 6 | SFQ | BYK-181[a] | 0.06 | 0.15 | 0.25 |
| 7 | Regal 300 | OMT | 0.06 | 0.12 | 0.19 |
| 8 | Regal 300 | BYK-181 | 0.07 | 0.12 | 0.19 |
| 9 | SFB | OMT | 0.05 | 0.11 | 0.26 |
| 10 | p.y. 139[b] | OMT | 0.06 | 0.12 | 0.22 |
| 11 | Regal 300 | Morez 101 | 0.05 | 0.11 | 0.18 |

[a]BYK-181: an anionic dispersing agent obtained from BYK-Chemie U.S.A.
[b]p.y. 139: Paliotol Yellow K1841, from BASF Ink Performance Inks were made from the above dispersions as follows: to an aliquot of the dispersion containing 4.0 g pigment was added 5.0 g diethylene glycol, 5.0 g glycerol, and enough water to reach 100 g. The ink was filtered through 3-μm filter and introduced into a high capacity HP cartridge model 51626A. The cartridge was then installed on a HP DeskJet® 540 printer. Images were printed on Xerox DP4024 paper, which is a general purpose printing and copying paper. Excellent image quality was obtained from all the inks containing OMT. Images from inks containing BYK-181 were not as sharp and as uniform. Images from inks containing Morez-101 were characterized by intermittent lines, non-uniform density, and poor image quality. Results are summarized in the following table:

| Example | Image Quality | Optical Density |
| --- | --- | --- |
| 5 | excellent | 1.3 |
| 6 | not uniform | 1.1 |
| 7 | excellent | 1.4 |
| 8 | not uniform | 1.0 |
| 9 | excellent | 1.2 |
| 10 | excellent | 1.3 |
| 11 | poor | varies |

EXAMPLE 12

A mill grind was prepared by mixing 16.0 g of pigment 7 (Regal 300), 12.0 g OMT dispersing agent and 112 g de-ionized water followed by ball milling the mixture on a Sweco vibratory mill for 4 days using 1-mm zirconium oxide milling media. The millgrind exhibited pigment particle size much less than one micron in size and excellent colloidal stability.

EXAMPLE 13

Example 12 was repeated except that instead of using carbon black, pigment blue 15:4 (Sunfast Blue, Sun Chemical Co,) was used. The same results were obtained.

EXAMPLE 14

Example 12 was repeated except that instead of using carbon black, pigment yellow 83 (Novoperm Yellow HR, Hoechst Chemical Co.) was used. The same results were obtained.

The invention has been described in detail with particular reference to preferred embodiments thereof, but it will be understood that variations and modifications can be effected within the spirit and scope of the invention.

We claim:

1. An ink jet printing method, comprising the steps of:
   providing an ink jet printer that is responsive to digital data signals;
   loading the printer with ink receptive substrates;
   loading the printer with an aqueous ink jet ink, said ink
   A) comprising a pigment, an aqueous carrier and sodium N-methyl-N-oleoyl taurate; and
   B) having a surface tension of 20 to 60 dynes/cm at 25° C., a viscosity of 1 to 5 centipose at 25° C. and a particle size of less than 1.5 μm; and
   printing on an ink receptive element in response to the digital data signals.

2. The ink jet ink printing method of claim 1 comprising from 0.1 to 10.0 weight percent of an organic pigment and from 0.05 to10.0 weight percent sodium N-methyl-N-oleoyl taurate.

3. The ink jet ink printing method of claim 1 wherein the pigment is selected from pigment black 7, pigment red 122,pigment blue 15, pigment yellow 139 and mixtures of two or more of such pigments.

4. The ink jet ink printing method of claim 1 wherein the pigment is organic.

5. The ink jet ink printing method of claim 1 wherein the ink further comprises a cosolvent selected from the group consisting of methyl alcohol, ethyl alcohol, n-propyl alcohol, iso-propyl alcohol, n-butyl alcohol, iso-butyl alcohol, sec-butyl alcohol, ethylene glycol, diethylene glycol, propylene gylcol, dipropylene glycol, 1,5-pentanediol, thiodiglycol, 2-ethyl-2-hydroxymethylpropane-1,3-diol, 2-pyrrolidone, N-methyl-2-pyrrolidone and mixtures of two or more of such solvents.

* * * * *